United States Patent
Choi et al.

(10) Patent No.: US 9,664,540 B2
(45) Date of Patent: May 30, 2017

(54) DEVICE INCLUDING OPTICAL SENSOR

(71) Applicant: Samsung Electronics Co., Ltd., Suwon-si, Gyeonggi-do (KR)

(72) Inventors: Seung-Ki Choi, Hwaseong-si (KR); Seung-Hoon Lee, Seoul (KR); Joon Heo, Suwon-si (KR); Jong-Jin Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 14/591,289

(22) Filed: Jan. 7, 2015

(65) Prior Publication Data

US 2015/0192438 A1     Jul. 9, 2015

Related U.S. Application Data

(60) Provisional application No. 61/924,593, filed on Jan. 7, 2014.

(30) Foreign Application Priority Data

Feb. 21, 2014    (KR) .......................... 10-2014-0020824

(51) Int. Cl.
*G01D 11/26* (2006.01)
*G06F 1/16* (2006.01)

(52) U.S. Cl.
CPC ........... *G01D 11/26* (2013.01); *G06F 1/1626* (2013.01)

(58) Field of Classification Search
CPC ...... G01D 11/26; G01D 11/245; G01F 1/1626
See application file for complete search history.

(56) References Cited

U.S. PATENT DOCUMENTS

| | | | |
|---|---|---|---|
| 4,015,595 A | 4/1977 | Benjamin, Jr. | |
| 4,183,360 A * | 1/1980 | Carlson | A61B 5/02416 356/39 |
| 4,239,048 A * | 12/1980 | Steuer | A61B 5/024 600/479 |
| 5,697,367 A * | 12/1997 | Lewis | A61B 5/14553 600/310 |
| 6,747,561 B1 * | 6/2004 | Reeves | G06F 1/1626 340/573.1 |
| 2005/0157971 A1 * | 7/2005 | Juijve | G06F 1/1616 385/12 |
| 2008/0303681 A1 * | 12/2008 | Herz | G06F 1/1616 340/671 |
| 2009/0203998 A1 * | 8/2009 | Klinghult | A61B 5/02416 600/443 |
| 2010/0085316 A1 * | 4/2010 | Kim | G06F 1/1616 345/173 |
| 2010/0099464 A1 * | 4/2010 | Kim | G06F 1/1615 455/566 |
| 2010/0217100 A1 * | 8/2010 | LeBoeuf | A61B 5/00 600/301 |

(Continued)

*Primary Examiner* — David Bolduc
(74) *Attorney, Agent, or Firm* — Jefferson IP Law, LLP

(57) ABSTRACT

A device including an optical sensor is provided. The device includes a window including a first region, a second region and a partial region located between the first region and the second region, an optical sensor located inside one region among the first region and the second region, and a light blocking part formed in the partial region of the window.

20 Claims, 15 Drawing Sheets

(56) References Cited

U.S. PATENT DOCUMENTS

| | | | | |
|---|---|---|---|---|
| 2010/0273530 A1* | 10/2010 | Jarvis | ............. | F16F 1/027 455/566 |
| 2011/0018800 A1* | 1/2011 | Ahn | ............. | G06F 1/1616 345/157 |
| 2011/0065482 A1* | 3/2011 | Koide | ............. | A61B 5/02438 455/566 |
| 2012/0118773 A1* | 5/2012 | Rayner | ............. | G06F 1/1626 206/320 |
| 2012/0190944 A1* | 7/2012 | Thaveeprungsriporn | ............. | G01N 21/3151 600/310 |
| 2012/0314354 A1* | 12/2012 | Rayner | ............. | G06F 1/1656 361/679.01 |
| 2013/0005303 A1* | 1/2013 | Song | ............. | A61B 5/02438 455/411 |
| 2013/0072145 A1* | 3/2013 | Dantu | ............. | H04M 11/04 455/404.1 |
| 2013/0094184 A1* | 4/2013 | Lee | ............. | G02F 1/133512 362/97.1 |
| 2013/0271902 A1* | 10/2013 | Lai | ............. | H04R 1/02 361/679.01 |
| 2013/0289366 A1* | 10/2013 | Chua | ............. | A61B 5/0205 600/301 |
| 2013/0296714 A1* | 11/2013 | Kassim | ............. | A61B 5/6898 600/479 |
| 2013/0310656 A1* | 11/2013 | Lim | ............. | A61B 5/6898 600/301 |
| 2014/0051941 A1* | 2/2014 | Messerschmidt | ..... | A61B 5/6898 600/301 |
| 2014/0103789 A1* | 4/2014 | Cox, III | ............. | H05K 5/02 312/280 |
| 2014/0128132 A1* | 5/2014 | Cox, III | ............. | H04B 1/3888 455/575.8 |
| 2014/0152890 A1* | 6/2014 | Rayner | ............. | G06F 1/1626 348/376 |
| 2015/0182132 A1* | 7/2015 | Harris | ............. | A61B 5/0295 340/870.01 |
| 2015/0201065 A1* | 7/2015 | Shim | ............. | H04M 1/72569 455/556.1 |

* cited by examiner

DEVICE INCLUDING OPTICAL SENSOR

CROSS-REFERENCE TO RELATED APPLICATION(S)

This application claims the benefit under 35 U.S.C. §119(e) of a U.S. Provisional application filed on Jan. 7, 2014 in the U.S. Patent and Trademark Office and assigned Ser. No. 61/924,593, and under 35 U.S.C. §119(a) of a Korean patent application filed on Feb. 21, 2014 in the Korean Intellectual Property Office and assigned Serial number 10-2014-0020824, the entire disclosure of each of which is hereby incorporated by reference.

TECHNICAL FIELD

The present disclosure relates to a device. More particularly, the present disclosure relates to a device including an optical sensor.

BACKGROUND

With the improvement of performance of electronic devices (e.g., smart phones) or wearable electronic devices, the electronic devices may include various sensors for acquiring various information related to the electronic devices, the outside of the electronic devices, and users of the electronic devices. For example, the electronic devices can include sensors such as bio-physical sensors including, for example, PhotoPlethysmoGraphy (PPG) modules, fingerprint sensors, proximity sensors, illumination sensors and the like.

The electronic devices may also include optical sensors for acquiring information related to the outside environment and/or related to the users of the electronic devices. The optical sensors can be at least partially exposed to the outside of the electronic devices in order for the optical sensors to sense light entering from the outside of the electronic devices.

According to the related art, an optical sensor included in an electronic device is located in an internal part of a window penetrable by light, in order for the optical sensor to be at least partially exposed to the outside of the electronic device. If the window is bigger than the optical sensor, then the optical sensor may sense light that is unnecessary for a function of the optical sensor. To prevent the optical sensor from sensing the unnecessary light, the window is restricted in size. So, there is a limit in constructing an appearance of the electronic device. Also, if the electronic device includes a plurality of optical sensors, because the plurality of optical sensors cannot be located in an internal part of one window, the plurality of optical sensors should be located in internal parts of a plurality of windows, respectively. Accordingly, the electronic device needs to include the plurality of windows. This results in an increase of constituent elements of the electronic device and the complexity of a manufacturing process of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device including an optical sensor.

In accordance with an aspect of the present disclosure, a device is provided. The device includes a window including a first region, a second region and a partial region located between the first region and the second region, an optical sensor located inside one region among the first region and the second region, and a light blocking part formed in the partial region of the window.

In accordance with another aspect of the present disclosure, an electronic device is provided. The electronic device includes a window including a first region, a second region and a partial region located between the first region and the second region, an optical sensor located inside one region among the first region and the second region, and a light blocking part formed in the partial region of the window.

In accordance with another aspect of the present disclosure, an electronic device is provided. The electronic device includes a window including a first region, a second region and a partial region located between the first region and the second region, an optical sensor located inside one region among the first region and the second region, and a light blocking part located in a groove provided by penetrating the partial region of the window.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
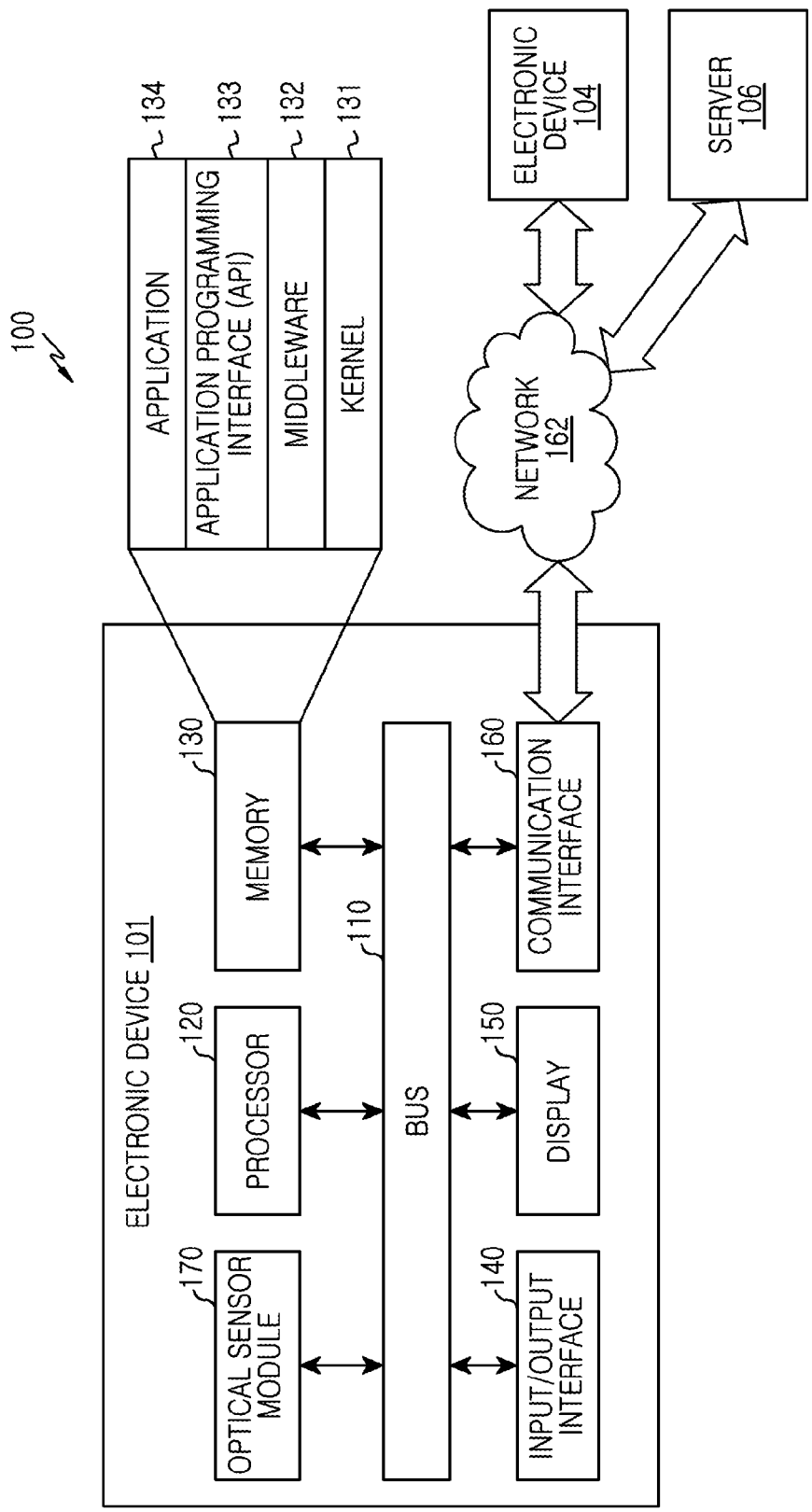
FIG. 1 is a diagram illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure can be described herein below with reference to the accompanying drawings. The various embodiments of the present disclosure can make various modifications and can have several embodiments. Specific embodiments are illustrated in the drawings and a related detailed description is made. But, these do not intend to limit various embodiments of the present disclosure to a specific embodiment form, and should be understood as including all changes and/or equivalents or alternatives included in the spirit and technical scope of various embodiments of the present disclosure. Regarding a description of the drawings, like reference numerals are used for like constituent elements.

Expressions such as "comprise", "include", "can comprise", "can include", and the like usable in various embodiments of the present disclosure indicate the existence of disclosed corresponding functions, operations, constituent elements and the like, and do not intend to limit additional one or more functions, operations, constituent elements or the like. Also, in various embodiments of the present disclosure, it should be understood that the terms such as "comprise", "include", "have" and the like indicate the existence of a feature stated in the specification, a number, a step, an operation, a constituent element, a component, or a combination thereof, and do not intend to previously exclude a possibility of existence or supplement of one or more other features, numbers, steps, operations, constituent elements, components, or combinations thereof.

In various embodiments of the present disclosure, the expressions such as "or" and the like include any and all combinations of words enumerated together. For example, the expression "A or B" can include "A" or can include "B" or can also include both "A" and "B".

In various embodiments of the present disclosure, the expressions such as "first", "second", "first", "second" and the like can modify various constituent elements according to various embodiments of the present disclosure, but do not intend to limit the corresponding constituent elements. For example, the expressions do not limit the order and/or importance of the corresponding constituent elements and the like. The expressions can be used to distinguish one constituent element from another constituent element. For example, a first user device and a second user device are all user devices, and represent different user devices. For example, a first constituent element can be named as a second constituent element without departing from the scope of right of various embodiments of the present disclosure. Likely, even a second constituent element can be named as a first constituent element.

When it is mentioned that any constituent element is "connected" or "accessed" to another constituent element, it should be understood that the any constituent element can be directly connected or accessed to the another constituent element or the third constituent element can also exist between the any constituent element and the another constituent element. In contrast, when it is mentioned that any constituent element is "directly connected" or "directly accessed" to another constituent element, it should be understood that the third constituent element does not exist between the any constituent element and the another constituent element.

The terms used in various embodiments of the present disclosure are used for just merely describing specific embodiments, and do not intend to limit the spirit and scope of the various embodiments of the present disclosure. The expression of a singular number includes the expression of plural numbers unless the context clearly dictates otherwise.

Unless defined otherwise, all the terms used herein including the technological or scientific terms have the same meaning as those generally understood by a person having ordinary knowledge in the art which various embodiments of the present disclosure belong to. The terms as defined in a general dictionary should be interpreted as having the same meanings as the contextual meanings of a related technology, and are not interpreted as having ideal or excessively formal meanings unless defined clearly in various embodiments of the present disclosure.

An electronic device according to various embodiments of the present disclosure can be a device including an optical sensor. For example, the electronic device can include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, a camera, and a wearable device (e.g., a Head-Mounted Display (HMD) such as electronic glasses, electronic clothes, an electronic bracelet, an electronic necklace, an appcessory, an electronic tattoo, or a smart watch).

According to various embodiments of the present disclosure, the electronic device can be a smart home appliance with an optical sensor. The smart home appliance, for example, the electronic device can include at least one of a television (TV), a Digital Video Disk (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, and an electronic frame.

According to various embodiments of the present disclosure, the electronic device can include at least one of a variety of medical instruments (e.g., Magnetic Resonance Angiography (MRA), Magnetic Resonance Imaging (MRI), Computed Tomography (CT), a scanning machine, an ultrasonic machine and the like), a navigation device, a Global Positioning System (GPS) receiver, an Event Data Recorder (EDR), a Flight Data Recorder (FDR), a car infotainment device, an electronic equipment for ship (e.g., a navigation device for ship, a gyrocompass and the like), avionics, a security instrument, a head unit for vehicle, an industrial or household robot, an Automatic Teller's Machine (ATM) of a financial institution, and a Point Of Sales (POS) of a shop.

According to various embodiments of the present disclosure, the electronic device can include at least one of a part of furniture or building/structure having an optical sensor, an electronic board, an electronic signature receiving device, a projector, and various kinds of metering instruments (e.g., tap water, electricity, gas, radio wave metering instrument or the like). The electronic device according to various embodiments of the present disclosure can be one or a combination of more of the aforementioned various devices. Also, the electronic device according to various embodiments of the present disclosure can be a flexible device. Also, it is apparent to those skilled in the art that the electronic device according to various embodiments of the present disclosure is not limited to the aforementioned instruments.

An electronic device according to various embodiments of the present disclosure will be described below with reference to the accompanying drawings. The term 'user' used in various embodiments of the present disclosure can denote a person who uses the electronic device or a device (e.g., an artificial intelligence electronic device) which uses the electronic device.

FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a diagram illustrating a network environment including an electronic device according to an embodiment of the present disclosure.

Referring to FIG. 1, a network environment 100 including an electronic device 101 is illustrated, where the electronic device 101 may include a bus 110, a processor 120, a memory 130, an input/output interface 140, a display 150, a communication interface 160, and an optical sensor module 170.

The bus 110 can be a circuit connecting the aforementioned constituent elements with each other, and forwarding communication (e.g., a control message) between the aforementioned constituent elements.

The processor 120 can, for example, receive instructions from the aforementioned other constituent elements (e.g., the memory 130, the input/output interface 140, the display 150, the communication interface 160, the optical sensor module 170 and the like) through the bus 110, decipher the received instructions, and execute operation or data processing according to the deciphered instructions.

The memory 130 can store an instruction or data which is received from the processor 120 or the other constituent elements (e.g., the input/output interface 140, the display 150, the communication interface 160, the optical sensor module 170 and the like) or which is generated by the processor 120 or the other constituent elements. The memory 130 can, for example, include programming modules such as a kernel 131, middleware 132, an Application Programming Interface (API) 133, an application 134 and the like. The aforementioned programming modules can each be comprised of software, firmware, hardware or a combination of at least two or more of them.

The kernel 131 can control or manage system resources (e.g., the bus 110, the processor 120, the memory 130 and the like) used for executing operations or functions implemented in the remaining other programming modules, for example, the middleware 132, the API 133, and the application 134. Also, the kernel 131 can provide an interface of enabling the middleware 132, the API 133, or the application 134 to access and control or manage an individual constituent element of the electronic device 101.

The middleware 132 can play a role of relaying the API 133 or the application 134 to communicate with the kernel 131 and exchange data with the kernel 131. Also, regarding work requests received from the application 134, the middleware 132 can, for example, perform the controlling (e.g., scheduling or load balancing) of the work request in a method of allotting priority order capable of using the system resource (e.g., the bus 110, the processor 120, the memory 130 or the like) of the electronic device 101 to at least one application among the applications 134.

The API 133 is an interface for allowing the application 134 to control a function provided in the kernel 131 or the middleware 132 and can, for example, include at least one interface or function (e.g., an instruction) for file control, window control, image processing, character control or the like.

According to various embodiments of the present disclosure, the application 134 can include a Short Message Service (SMS)/Multimedia Message Service (MMS) application, an electronic mail (e-mail) application, a calendar application, an alarm application, a health care application (e.g., an application measuring a momentum, a blood sugar or the like), an environment information application (e.g., an application providing air pressure, humidity, temperature information or the like) or the like. Additionally or alternatively, the application 134 can be an application associated with an information exchange between the electronic device 101 and an exterior electronic device (e.g., an electronic device 104). The application associated with the information exchange can, for example, include a notification relay application for relaying specific information to the exterior electronic device, or a device management application for managing the exterior electronic device.

For example, the notification relay application can include a function of relaying notification information generated in other applications (e.g., the SMS/MMS application, the e-mail application, the health care application, the environment information application and the like) of the electronic device 101, to the exterior electronic device (e.g., the electronic device 104). Additionally or alternatively, the notification relay application can, for example, receive the notification information from the exterior electronic device (e.g., the electronic device 104) and provide the received notification information to a user. The device management application can, for example, manage (e.g., install, delete or update) a function (e.g., turn-on/turn-off of the exterior electronic device itself or some constituent components thereof or adjustment of brightness or resolution of a display) of at least a part of the exterior electronic device (e.g., the electronic device 104) communicating with the electronic device 101, an application running in the exterior electronic device, or a service (e.g., call service or messaging service) provided in the exterior electronic device.

According to various embodiments of the present disclosure, the application 134 can include an application designated in accordance to an attribute (e.g., the kind of electronic device) of the exterior electronic device (e.g., the electronic device 104). For example, if the exterior electronic device is an MP3 player, the application 134 can include an application associated with music playback. Similarly, if the exterior electronic device is a mobile medical instrument, the application 134 can include an application associated with health care. According to an embodiment of the present disclosure, the application 134 can include at least one of an application designated to the electronic device 101 and an application received from the exterior electronic device (e.g., a server 106 or the electronic device 104).

The input/output interface 140 can forward an instruction or data inputted from a user through an input output device (e.g., a sensor, a keyboard or a touch screen), for example, to the processor 120, the memory 130, the communication interface 160, or the optical sensor module 170 through the bus 110. For example, the input/output interface 140 can provide the processor 120 with data about a user's touch inputted through a touch screen. Also, the input/output interface 140 can, for example, output through an input/output device (e.g., a speaker or a display) an instruction or data received from the processor 120, the memory 130, the communication interface 160, and/or the optical sensor module 170 through the bus 110. For example, the input/output interface 140 can output voice data processed through the processor 120, to the user through the speaker.

The display 150 can display various information (e.g., multimedia data, text data, or the like) to a user.

The communication interface 160 can connect communication between the electronic device 101 and the exterior device (e.g., the electronic device 104 or the server 106). For example, the communication interface 160 can connect to a network 162 through wireless communication or wired communication and communicate with the exterior device. The wireless communication can, for example, include at least one of Wireless Fidelity (WiFi), Bluetooth (BT), Near Field Communication (NFC), Global Positioning System (GPS), and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM) or the like. The wired communication can, for example, include at least one of Universal Serial Bus (USB), High Definition Multimedia Interface (HDMI), Recommended Standard-232 (RS-232), and Plain Old Telephone System (POTS).

According to an embodiment of the present disclosure, the network 162 can include a telecommunications network. The telecommunications network can include at least one of a computer network, the Internet, the Internet of Things (IoT), and a telephone network. According to an embodiment of the present disclosure, a protocol (e.g., a transport layer protocol, a data link layer protocol, or a physical layer protocol) for communication between the electronic device 101 and the exterior device can be supported in at least one of the application 134, the application programming interface 133, the middleware 132, the kernel 131, and the communication interface 160. The optical sensor module 170 can include a window penetrable by light, at least one optical sensor located inside the window, and a light blocking part of light shielding materials formed in a partial region of the window.

According to various embodiments of the present disclosure, the optical sensor can sense light necessary for the electronic device. The optical sensor can be, for example, at least one of a PhotoPlethysmoGraphy (PPG) module (e.g., a Heart Rate Monitor (HRM) sensor), a proximity sensor, an illumination sensor, an iris recognition sensor, and a fingerprint recognition sensor. According to an embodiment of the present disclosure, an electronic component can be further arranged in an internal part of the window. The electronic component can, for example, include an electronic device that emits light. The electronic component can be, for example, at least one of a flash, a proximity sensor, a camera module, an illumination sensor, an optical key button, and a Light Emitting Diode (LED) indicator. According to various embodiments of the present disclosure, the optical sensor and/or the electronic component are not limited to the aforementioned example.

The PPG module can, for example, measure a transmittance amount of light through the human body of a user, and sense a variation of blood flow of a peripheral blood vessel or a variation of a volume of a blood vessel based on the iteration of heart relaxation and contraction. The electronic device can provide the user with waveform information about a heartbeat and a variation of blood volume or oxygen saturation within a blood vessel, using information sensed through the PPG module.

A way of conducting PPG in the electronic device can, for example, include a method of conducting PPG with a finger coming in contact with a sensor portion. For example, light (e.g., an Infrared (IR) ray) irradiated from an LED included in the PPG module can pass several finger media and diffuse or scatter while spreading out. At least a part of the diffusing or scattering light can be detected through, for example, a photo detector (e.g., a photo diode) included in the PPG module.

In various embodiments of the present disclosure, the electronic device can include the optical sensor (e.g., the PPG module). The optical sensor can be located in an internal part of a partial region of the window included in the electronic device. According to an embodiment of the present disclosure, for example, at least one other electronic component (e.g., a flash) can be located in an internal part of the other region of the window. The window can include a light blocking part between the partial region of the window and the other region thereof. The light blocking part can block out at least a part of exterior light introduced from the outside of the optical sensor. The following description is made in which the optical sensor is an HRM sensor and the other electronic component is the flash, for example, but various embodiments of the present disclosure are not limited to this.

Figure 2A:
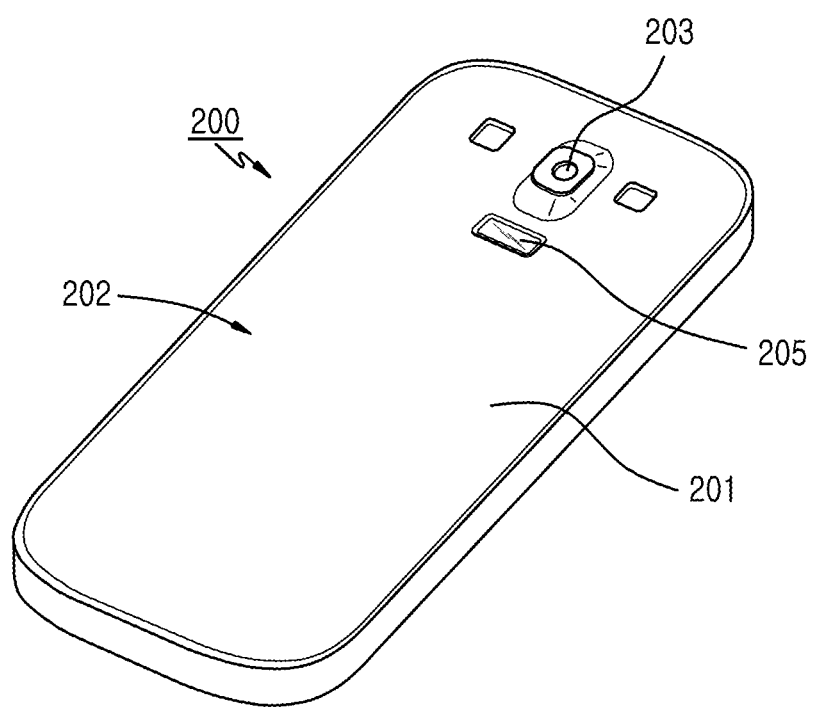
FIG. 2A is a rear perspective view illustrating an electronic device arranging an optical sensor according to an embodiment of the present disclosure.

FIG. 2A is a rear perspective view illustrating an electronic device arranging an optical sensor according to an embodiment of the present disclosure.

Referring to FIG. 2A, an electronic device 200 can include an HRM sensor 205 arranged in a rear surface 202 thereof. According to an embodiment of the present disclosure, the HRM sensor 205 can measure a pulse of a user of the electronic device, as well as a heartbeat, an oxygen saturation and the like of the user. According to an embodiment of the present disclosure, the HRM sensor 205 can include an LED (e.g., an IR LED, a red LED, or a green LED) and a photo detector (or a photo diode). Also, according to an embodiment of the present disclosure, the HRM sensor 205 can, for example, include an analog signal processing part processing a signal sensed in an optical part, and an Analog to Digital Converter (ADC) converting the sensed signal into digital data.

According to an embodiment of the present disclosure, by making light permeate a blood vessel of the human body, for example, through the LED or the IR LED and sensing a returning light using the photo detector, the HRM sensor 205 can measure, for example, a user's heartbeat, oxygen saturation, and/or blood flow.

According to various embodiments of the present disclosure, the HRM sensor 205 can be arranged in various positions of the rear surface 202 of the electronic device 200. For example, the HRM sensor 205 can be installed adjacent to a camera device 203 arranged in the rear surface 202 of the electronic device 200. For example, the HRM sensor 205 can be located to be partially exposed to an exterior housing 201 constructing the electronic device 200. Also, for example, the HRM sensor 205 can be arranged in a position with which a user's finger (e.g., a forefinger) can get in contact when a user holds the electronic device 200 with his/her hand. For example, the HRM sensor 205 can be located by a flash. In this case, a window for the flash can be extended to the position of the HRM sensor 205.

Figure 2B:
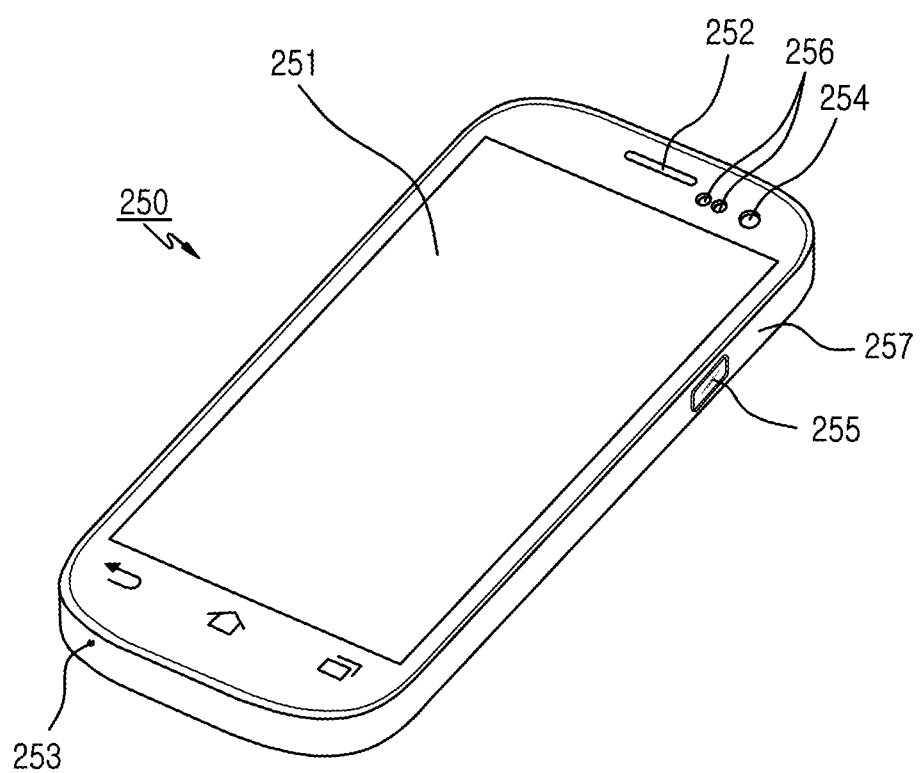
FIG. 2B is a front perspective view illustrating an electronic device arranging an optical sensor according to an embodiment of the present disclosure.

FIG. 2B is a front perspective view illustrating an electronic device arranging an optical sensor according to an embodiment of the present disclosure.

Referring to FIG. 2B, an electronic device 250 is illustrated, where a display 251 can be installed in a front surface of the electronic device 250. A speaker device 252 for receiving a counterpart's voice can be installed in the upper side of the display 251. A microphone device 253 for sending a user's voice to a counterpart can be installed in the lower side of the display 251.

According to an embodiment of the present disclosure, components for performing various functions of the electronic device 250 can be arranged around the speaker device 252. The components can include a camera device 254. Also, the components can, for example, include at least one sensor module 256. This sensor module 256 can, for example, include an illumination sensor (e.g., an optical sensor) and/or a proximity sensor (e.g., an optical sensor). According to an embodiment of the present disclosure, though not illustrated, the components can further include at least one LED indicator, for example.

According to an embodiment of the present disclosure, an HRM sensor 255 can be also arranged at a side surface 257 of the electronic device 250. In this case, if a hand holding the electronic device 250 is a right hand, the HRM sensor 255 can be, for example, arranged in a predetermined position of the side surface 257 with which a user's finger can get in contact. If the hand holding the electronic device 250 is a left hand, the HRM sensor 255 can be, for example, arranged in a predetermined position of the side surface 257 with which a user's finger can get in contact.

According to an embodiment of the present disclosure, the HRM sensor 255 can be also installed at various positions of the electronic device 250. For instance, one HRM sensor 255 can be arranged in the rear surface 202 of the electronic device 200 as in FIG. 2A and/or can be arranged in the side surface 257 of the electronic device 250 as in FIG. 2B. According to an embodiment of the present disclosure, the electronic devices 200 and 250 can drive both of the HRM sensors 205 and 255 and acquire vital information through the two HRM sensors 205 and 255, respectively.

Figure 3A:
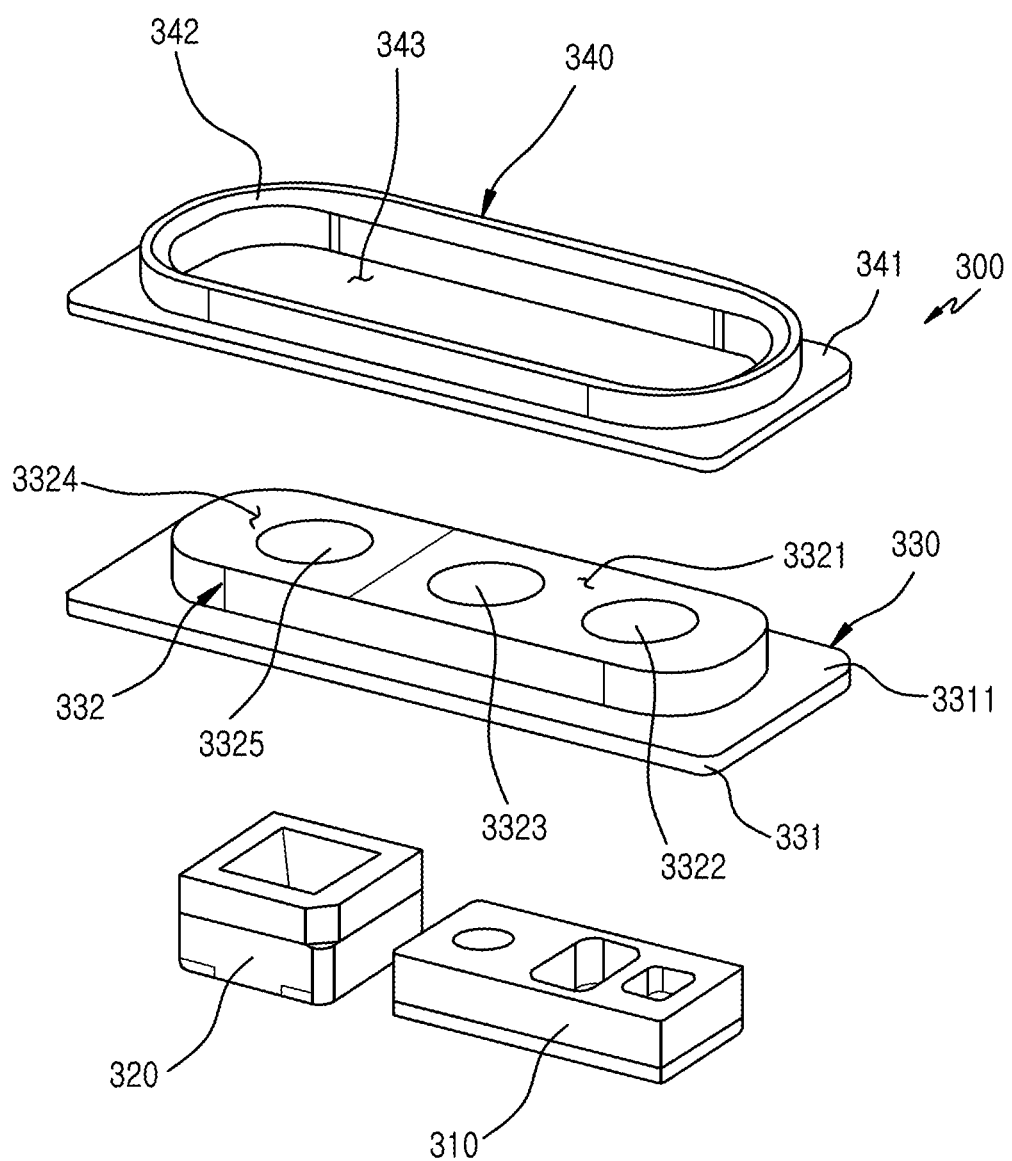
FIG. 3A is a front exploded perspective view illustrating an optical sensor module according to an embodiment of the present disclosure.

FIG. 3A is a front exploded perspective view illustrating an optical sensor module according to an embodiment of the present disclosure.

Referring to FIG. 3A, an HRM sensor module 300 including an HRM sensor 310 and a flash 320 are illustrated as an embodiment of the present disclosure. However, the various embodiments of the present disclosure are not limited to this. For instance, in place of the HRM sensor 310, other optical sensors can be applied, and at least one other electronic component in addition to the flash 320 can be also applied.

Furthermore, referring to FIG. 3A, a window 330 of transparent or semitransparent material can be arranged on the HRM sensor 310 and flash 320. Additionally or alternatively, according to an embodiment of the present disclosure, a fixing (decoration) part 340 can be arranged on the window 330.

According to an embodiment of the present disclosure, the window 330 can cover both the HRM sensor 310 and the flash 320. According to an embodiment of the present disclosure, the window 330 can include a plate 331 of a predetermined width and a first protrusion part 332 protruded from a first surface 3311 of the plate 331. The first protrusion part 332 can be coupled with an opening 343 of the housing 340. A flash region 3324 of the first protrusion part 332 corresponding to the flash 320 and an HRM sensor region 3321 thereof corresponding to the HRM sensor 310 can be exposed from an outer surface of an exterior housing of an electronic device.

According to an embodiment of the present disclosure, the first protrusion part 332 can include the flash region 3324 and the HRM sensor region 3321. According to an embodiment of the present disclosure, the flash region 3324 can include a flash wave guide part 3325 for wave guiding (e.g., forwarding) light, which is irradiated from the flash 320, to the outside. According to an embodiment of the present disclosure, for example, the HRM sensor region 3321 can, for example, include a light-emitting wave guide part 3323 for wave guiding an infrared ray irradiated from, for example, an infrared LED included in the HRM sensor 310, and a light-receiving wave guide part 3322 corresponding to a light receiving part that is included in the HRM sensor 310 and senses an infrared ray reflected from the human body (e.g., a finger) of a user. For example, among the window 330, at least the flash wave guide part 3325, the light-emitting wave guide part 3323, and the light-receiving wave guide part 3322 can be formed transparently. According to an embodiment of the present disclosure, the light-receiving wave guide part 3322 can be arranged farther away from the flash region 3324 than the light-emitting wave guide part 3323. According to various embodiments of the present disclosure, the fixing (decoration) part 340 can include a flange 341 fixed to the exterior housing of the electronic device and an exposure part 342 protruded from the flange 341 and exposed to the exterior housing of the electronic device. According to an embodiment of the present disclosure, the fixing part 340 can have the opening 343 for housing the first protrusion part 332 of the window 330. The exposure part 342 can be, for example, formed along an edge of the opening 343 to protrude from the exterior housing of the electronic device. According to an embodiment of the present disclosure, the fixing part 340 can be, for example, formed of various materials such as metal, plated synthetic resin material and the like.

Figure 3B:
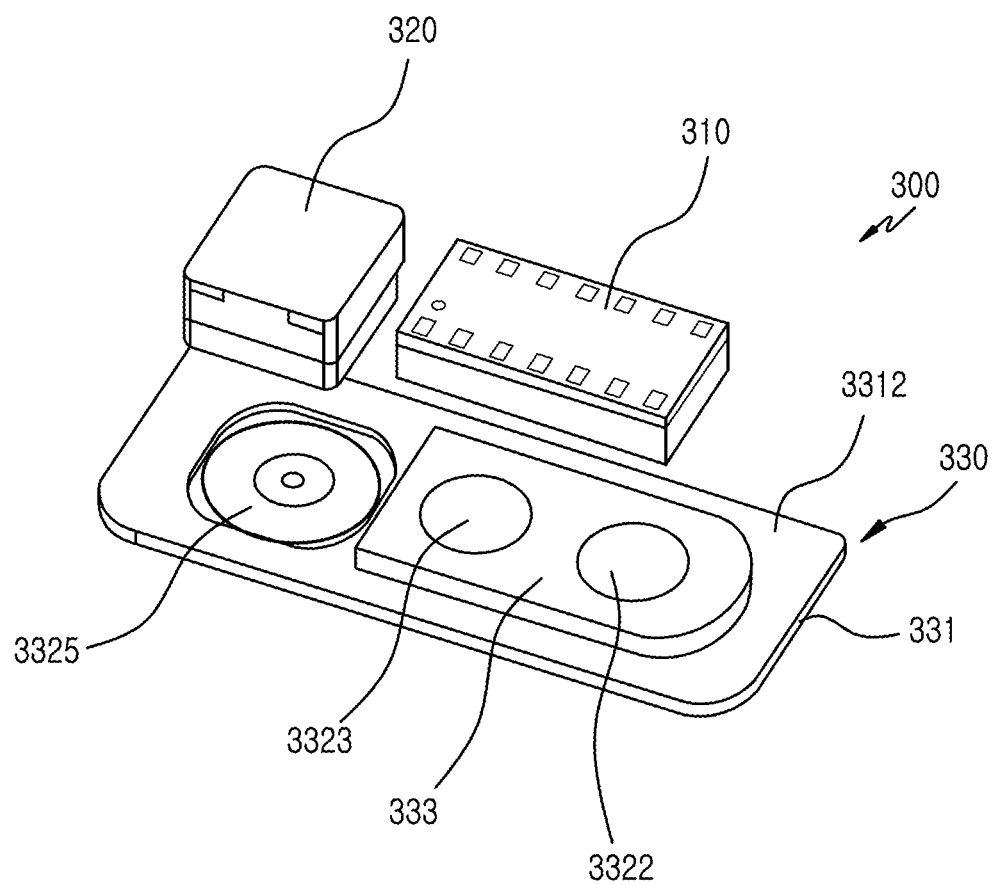
FIG. 3B is a rear exploded perspective view illustrating an optical sensor module according to an embodiment of the present disclosure.

FIG. 3B is a rear exploded perspective view illustrating an optical sensor module according to an embodiment of the present disclosure.

Referring to FIG. 3B, according to an embodiment of the present disclosure, a second surface 3312 of a window 330 of an HRM sensor module 300 is illustrated, where the second surface 3312 can include a second protrusion part 333 protruded to have a certain height from a plate 331. For example, the second protrusion part 333 can be formed in a region corresponding to an HRM sensor 310. The second protrusion part 333 can include a light-emitting wave guide part 3323 and a light-receiving wave guide part 3322.

According to various embodiments of the present disclosure, the window 330 can cover both the HRM sensor 310 and a flash 320 performing different operations. According to an embodiment of the present disclosure, the window 330 can further include a light blocking part for excluding mutual interference between the HRM sensor 310 and the flash 320. According to an embodiment of the present disclosure, the light blocking part can be formed by black-print processing a top surface of the second protrusion part 333, except for regions of the light-emitting wave guide part 3323 and the light-receiving wave guide part 3322. According to an embodiment of the present disclosure, the light blocking part can be also formed by mirror-surface processing the top surface of the second protrusion part 333, except for the regions of the light-emitting wave guide part 3323 and the light-receiving wave guide part 3322. According to an embodiment of the present disclosure, the mirror-surface processed top surface of the second protrusion part 333 can prevent at least a part of light irradiated from the flash 320 from being arbitrarily introduced into the light-emitting wave guide part 3323 of the HRM sensor 310 or the light-receiving wave guide part 3322 thereof. According to an embodiment of the present disclosure, a flash wave guide part 3325 can be formed in the rear surface 3312 of the window 330 to have a stepped lower surface than the rear surface 3312 of the window 330. The flash wave guide part 3325 can also, for example, involve optical processing capable of extending or converging light irradiated from the flash 320.

According to an embodiment of the present disclosure, the light blocking part (not shown) can be installed between the flash 320 and the HRM sensor 310 sharing one window with each other. The light blocking part can be a light barrier for blocking out (or shielding) light to prevent an exterior optical signal (e.g., a visible ray band signal) from being delivered to an adjacent module (e.g., the HRM sensor 310). According to an embodiment of the present disclosure, if the flash 320 and the HRM sensor 310 are constructed in an integral type, the light barrier can be formed during a manufacturing process. Also, the light barrier can be, for example, formed after mounting the HRM sensor module 300 in the electronic device. Various embodiments of the present disclosure are not limited to the aforementioned method.

Figure 4A:
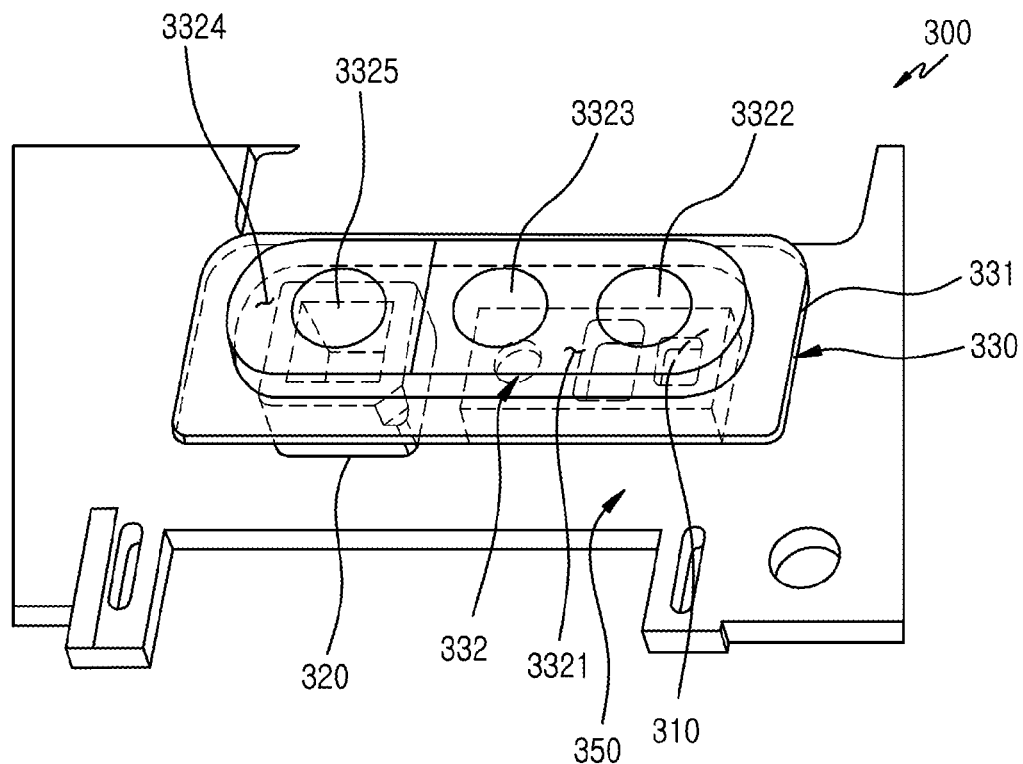
FIG. 4A is a perspective view illustrating an assembled state of an optical sensor module according to an embodiment of the present disclosure.
Figure 4B:
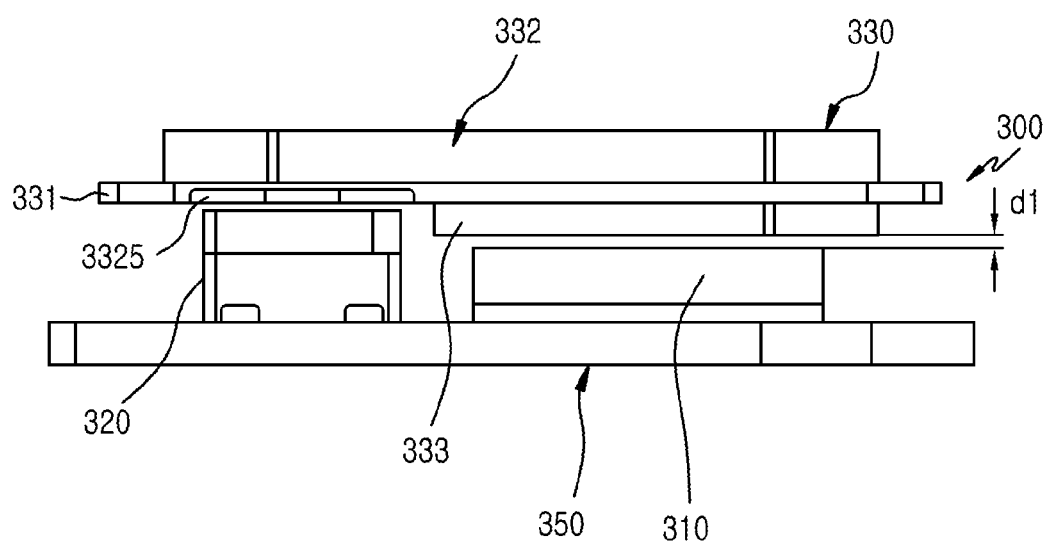
FIG. 4B is a lateral view illustrating an assembled state of an optical sensor module according to an embodiment of the present disclosure.

FIG. 4A is a perspective view illustrating an assembled state of an optical sensor module according to an embodiment of the present disclosure. FIG. 4B is a lateral view illustrating an assembled state of an optical sensor module according to an embodiment of the present disclosure.

Referring to FIGS. 4A and 4B, an HRM sensor module 300 is illustrated, where the HRM sensor module 300 can include a substrate 350, an HRM sensor 310 and a flash 320 mounted on an upper part of the substrate 350, and a window 330 arranged on an upper part of the HRM sensor 310 and flash 320. According to an embodiment of the present disclosure, the window 330 can include a flash region 3324 and an HRM sensor region 3321. According to an embodiment of the present disclosure, the window 330 can be arranged in a region in which a second protrusion part 333 and the HRM sensor 310 vertically overlap each other.

According to an embodiment of the present disclosure, the substrate 350 can be a rigid type Printed Circuit Board (PCB) on which the HRM sensor 310 and the flash 320 can be mounted. But, this does not intend to limit the spirit and scope of the present disclosure, such that the substrate 350 can be also a Flexible Printed Circuit Board (FPCB). According to an embodiment of the present disclosure, at least one of the HRM sensor 310 and the flash 320 can be installed in a structure arranged within the electronic device, instead of being mounted on the substrate 350. According to an embodiment of the present disclosure, at least one of the HRM sensor 310 and the flash 320 can be mounted on the substrate 350 by means of Surface Mount Technology (SMT).

Referring to FIGS. 4A and 4B, the HRM sensor 310 can be arranged in a state in which it is spaced a certain interval (d1) apart from the second protrusion part 333 of the window 330. The spaced interval (d1) can be an interval considering a printing thickness for black printing processing in a region, except for a light-emitting wave guide part 3323 and a light-receiving wave guide part 3322 of the second protrusion part 333. According to an embodiment of the present disclosure, the spaced interval (d1) can be, for example, formed to be 0.2 mm or less. But, this does not intend to limit the spirit and scope of the present disclosure, and the HRM sensor 310 and the second protrusion part 333 can also arranged in a way of coming in contact with each other.

Referring to FIGS. 4A and 4B, according to an embodiment of the present disclosure, a flash wave guide part 3325 can be formed in a rear surface of the window 330. Furthermore, according to an embodiment of the present disclosure, the window 330 can include a plate 331 of a predetermined width and a first protrusion part 332 protruded from a first surface of the plate 331.

Figure 5A:
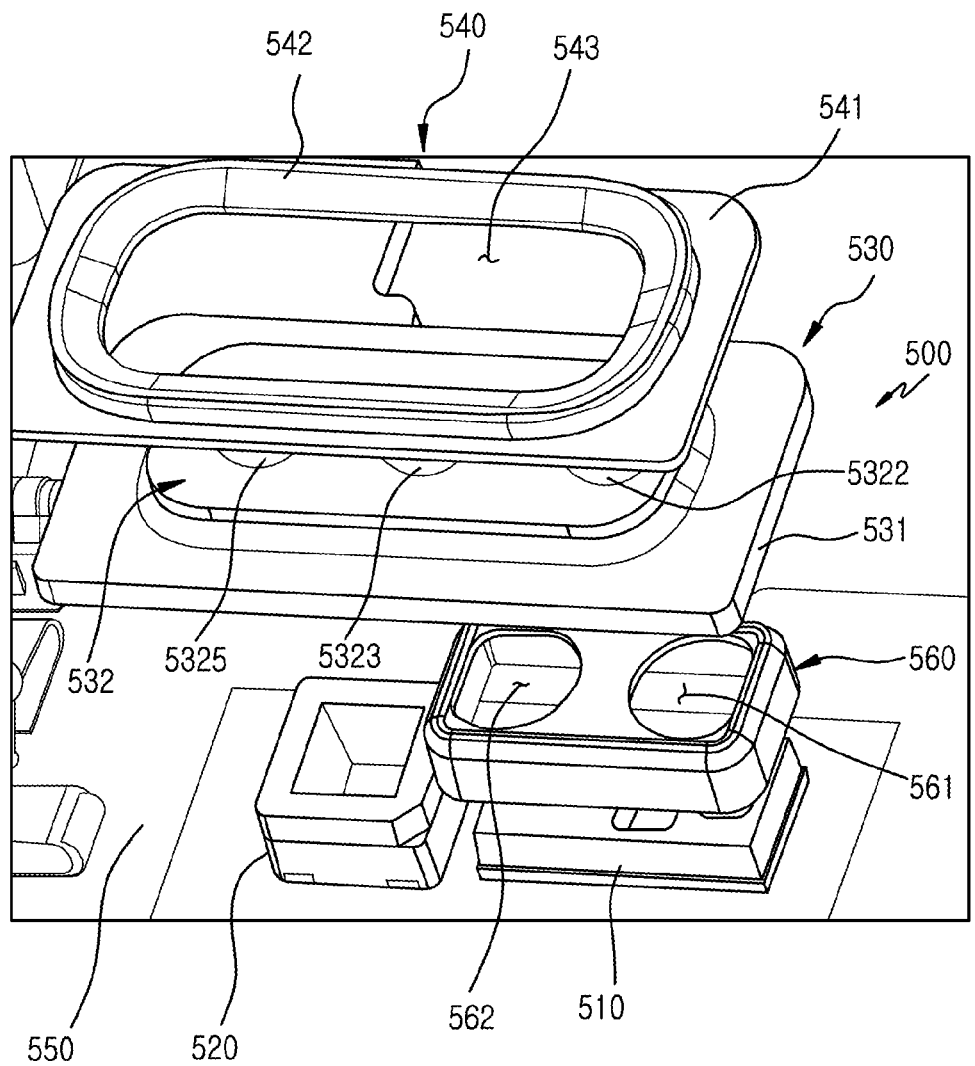
FIG. 5A is an exploded perspective view illustrating an optical sensor module according to an embodiment of the present disclosure.

FIG. 5A is an exploded perspective view illustrating an optical sensor module according to an embodiment of the present disclosure.

Referring to FIG. 5A, an HRM sensor module 500 is illustrated, where the HRM sensor module 500 can include an HRM sensor 510 and a flash 520 which are arranged side by side within an electronic device and can be mounted on an upper part of a substrate 550. According to an embodiment of the present disclosure, a window 530 of transparent material is arranged on an upper part of the HRM sensor 510 and flash 520, and a fixing part 540 can be arranged on an upper part of the window 530.

According to an embodiment of the present disclosure, the window 530 can be formed to have a size capable of covering both the HRM sensor 510 and the flash 520. According to an embodiment of the present disclosure, the window 530 can include a plate 531 of a certain width and a protrusion part 532 protruding from a top surface of the plate 531. The protrusion part 532 is coupled in such a way that it is safely mounted in an opening 543 of the fixing part 540 to be described later. By this, a flash wave guide part 5325 of the protrusion part 532 corresponding to the flash 520 and a light-emitting wave guide part 5323 and a light-receiving wave guide part 5322 thereof corresponding to the HRM sensor 510 can be exposed from an outer surface of an exterior housing of the electronic device. According to an embodiment of the present disclosure, among the window 530, at least the flash wave guide part 5325, the light-emitting wave guide part 5323, and the light-receiving wave guide part 5322 can be formed transparently.

According to various embodiments of the present disclosure, the fixing (decoration) part 540 can include a flange 541 fixed to the exterior housing of the electronic device and an exposure part 542 protruding from the flange 541 and exposed from the exterior housing of the electronic device. According to an embodiment of the present disclosure, the fixing part 540 can have the opening 543 for housing the protrusion part 532 of the window 530, and the exposure part 542 can be protruded and formed along an edge of the opening 543.

According to various embodiments of the present disclosure, the window 530 can be formed in such a way that it houses the HRM sensor 510 and the flash 520 performing different operations, together. According to an embodiment of the present disclosure, the HRM sensor 510 can further include a light blocking part 560 for excluding mutual interference between the HRM sensor 510 and the flash 520 performing different operations. According to an embodiment of the present disclosure, the light blocking part 560 can be applied in a cover type capable of covering the entire HRM sensor 510, except for openings 561 and 562 corresponding to a light emitting region and light receiving region of the HRM sensor 510. According to an embodiment of the present disclosure, the light blocking part 560 can be formed of opaque material. According to an embodiment of the present disclosure, the light blocking part 560 can be formed of various materials such as rubber, urethane, Polycarbonate (PC) and the like.

Figure 5B:
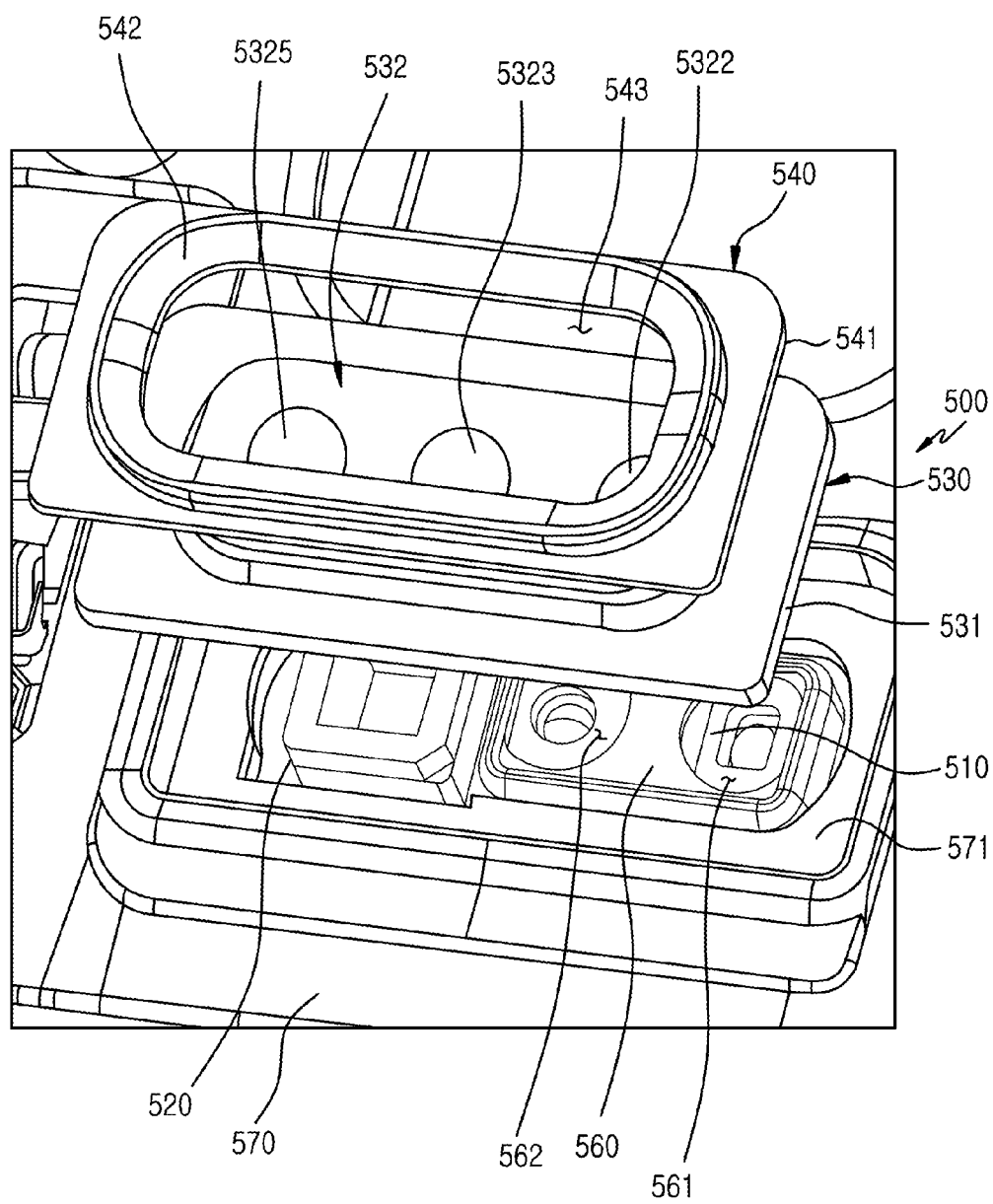
FIG. 5B is an exploded perspective view illustrating an optical sensor module according to an embodiment of the present disclosure.

FIG. 5B is an exploded perspective view illustrating an optical sensor module according to an embodiment of the present disclosure.

Referring to FIG. 5B, an HRM sensor module 500 is illustrated, where the HRM sensor module 500 has the same whole construction as the HRM sensor module 500 of FIG. 5A, and where a window 530 and a fixing part 540 are installed in an exterior housing 570 of an electronic device. According to an embodiment of the present disclosure, the exterior housing 570 can include a plate safe-mounting part 571 including an opening capable of exposing an HRM sensor 510 and a flange 520. According to an embodiment of the present disclosure, a plate 531 of the window 530 can be fixed to the plate safe-mounting part 571 of the exterior housing 570 in a safe mounting way. According to an embodiment of the present disclosure, the plate 531 can be fixed to the plate safe-mounting part 571 of the exterior housing 570 in a method of double-sided tape, bonding, ultrasonic welding and the like.

According to an embodiment of the present disclosure, the fixing part 540 can be fixed to an upper part of the window 530 including the plate 531 fixed to the plate safe-mounting part 571 of the exterior housing 570, in a method of double-sided tape, bonding, ultrasonic welding and the like. According to an embodiment of the present disclosure, the fixing part 540 can be fixed in such a way that a protrusion part 532 of the window 530 passes through an opening 543 of the fixing part 540, and can be fixed in such a way that, along an edge of the fixing part 540, a bottom surface thereof is in contact with to a top surface of the plate 531 of the window 530.

Furthermore, as illustrated in FIG. 5B and in the same manner as illustrated in FIG. 5A, an exposure part 542 protrudes from a flange 541, a flash wave guide part 5325 of the protrusion part 532 corresponding to the flash 520 and a light-emitting wave guide part 5323 and a light-receiving wave guide part 5322 thereof corresponding to the HRM sensor 510 can be exposed from an outer surface of an exterior housing of the electronic device, and a light blocking part 560 can be applied in a cover type capable of covering the entire HRM sensor 510, except for openings 561 and 562 corresponding to a light emitting region and light receiving region of the HRM sensor 510.

Figure 6:
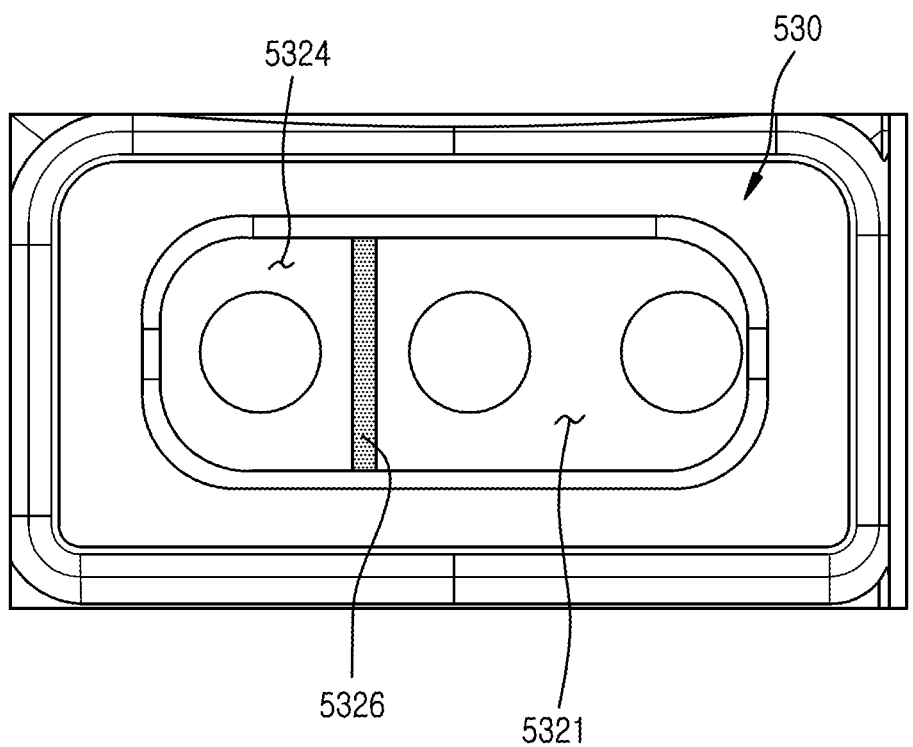
FIG. 6 is a plane diagram illustrating a window of an optical sensor module according to an embodiment of the present disclosure.

FIG. 6 is a plane diagram illustrating a window of an optical sensor module according to an embodiment of the present disclosure.

Referring to FIG. 6, a window 530 is illustrated, where the window 530 can include a first region 5324 (e.g., a flash region 3324) and a second region 5321 (e.g., an HRM sensor region 3321). According to an embodiment of the present disclosure, an optical sensor (e.g., an HRM sensor 310) can be located within the second region 5321 (or the first region 5324). According to an embodiment of the present disclosure, a light blocking part 5326 can be included in at least a partial region of the window 530. The light blocking part 5326 can be located between the first region 5324 and the second region 5321.

According to an embodiment of the present disclosure, the light blocking part 5326 can be formed integrally with the window 530. For example, the light blocking part 5326 can be formed in at least a partial region between a top surface of the window 530 and a bottom surface thereof, for instance, in a region of a designated depth from the top surface of the window 530 or a region of a designated depth from the bottom surface of the window 530. For example, the light blocking part 5326 can be formed from a region in which the window 530 comes in contact with an exterior housing of an electronic device.

For example, the light blocking part 5326 can be formed by etching processing at least a part of the window 530 corresponding to between the first region 5324 and the second region 5321. At least the part of the window 530 corresponding to the light blocking part 5326 can be etched and processed by means of material capable of blocking out at least a part of light. For example, the light blocking part 5236 can be formed by coloring at least the part of the window 530 corresponding to between the first region 5324 and the second region 5321 with color (e.g., black) capable of blocking out at least a part of light.

According to an embodiment of the present disclosure, at window injection-molding, the light blocking part 5326 can be formed by adding substance of light blocking materials (e.g., shielding substance of opaque materials, and substance of rubber, urethane, silicon or polycarbonate materials)

between the first region 5324 and the second region 5321 of the window 530, for example, by double injection-molding or insert molding.

Figure 7A:
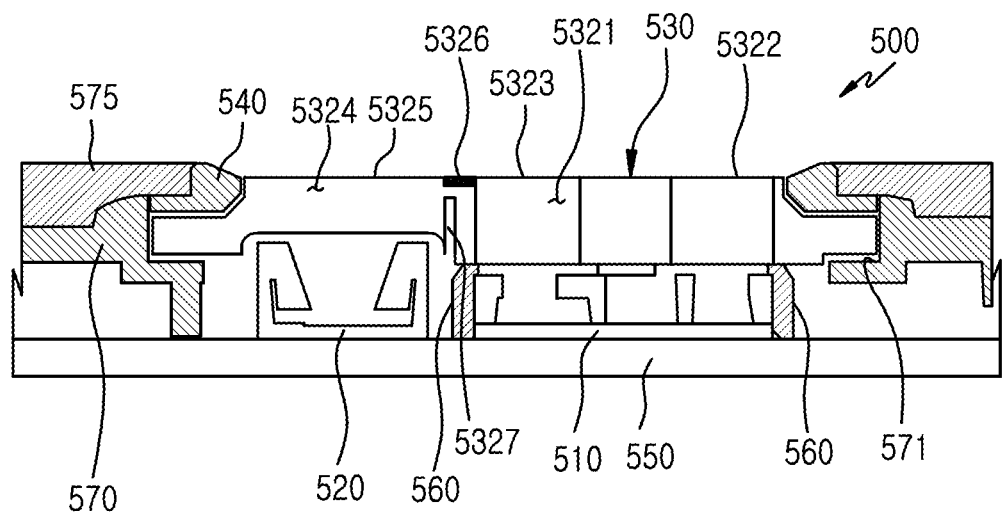
FIG. 7A is a principal part cross-section illustrating an optical sensor module according to van embodiment of the present disclosure.

FIG. 7A is a principal part cross-section illustrating an optical sensor module according to an embodiment of the present disclosure.

Referring to FIG. 7A, an optical sensor module 500 is illustrated, where the optical sensor module 500 can include a substrate 550, an optical sensor 510 mounted on an upper part of the substrate 550, and a window 530 for covering the optical sensor 510. Additionally or alternatively, the optical sensor module 500 can further include an electronic component 520 (e.g., a flash) in an internal part of the window 530. For example, the window 530 can be safely mounted in a plate safe-mounting part 571 included in an exterior housing 570 of an electronic device. For example, the window 530 can include a first region 5324 corresponding to the electronic component 520 and a second region 5321 corresponding to the optical sensor 510.

For example, the substrate 550 can be a rigid type PCB on which the optical sensor 510 or the electronic component 520 can be mounted. But, this does not intend to limit the spirit and scope of the present disclosure, such that the substrate 550 can be also an FPCB. According to an embodiment of the present disclosure, at least one of the optical sensor 510 and the electronic component 520 can be installed in a structure arranged within the electronic device, instead of being mounted on the substrate 550. Also, at least one of the optical sensor 510 and the electronic component 520 can be mounted on the substrate 550, for example, by means of SMT.

According to an embodiment of the present disclosure, at least a part of the window 530 can be connected with a fixing part 540. For example, the fixing part 540 can be formed to protrude more than the exterior housing 570 constructing an outer surface of the electronic device. According to an embodiment of the present disclosure, a top surface of the window 530 can be formed to have a height equal to or lower than a top surface of the exterior housing 570 of the electronic device. As illustrated, the top surface of the window 530 can be arranged to have a height equal to or lower than the fixing part 540. Additionally or alternatively, according to an embodiment of the present disclosure, a battery cover 575 can be further installed on an upper part of the exterior housing 570. The fixing part 540 can be also formed to be in parallel (or to form a plane) with a top surface of the battery cover 575 installed on the exterior housing 570.

According to an embodiment of the present disclosure, the window 530 can include light blocking parts 5326, 5327 and 560 in at least a portion between the first region 5324 and the second region 5321.

According to an embodiment of the present disclosure, the window 530 can include, as the light blocking part the region 5326, etching processing or coloring (e.g., black coloring) of at least a portion (e.g., upper part) of the window 530 so as to optically segregate the first region 5324 and the second region 5321. According to an embodiment of the present disclosure, the window 530 can include, as the light blocking part, the shielding groove 5327 provided by cutting away from a bottom surface of the window 530 to part of an upper side of the window 530. According to an embodiment of the present disclosure, the shielding groove 5327 can play a role of light shielding even by itself. According to an embodiment of the present disclosure, a light reflection paint for reflecting light, a colored paint for blocking out light, or the like can be further coated on an inner surface of the shielding groove 5327. According to an embodiment of the present disclosure, a light blocking part 560 can be located between the optical sensor 510 and the electronic component 520. The light blocking part 560 can be, for example, formed to cover at least a part of the optical sensor 510.

For example, the light blocking part can include a light blocking part for excluding mutual interference between the optical sensor and the electronic component. For example, the light blocking part can cover the entire optical sensor except for openings corresponding to a light emitting region and a light receiving region included in the optical sensor. For example, the light blocking part can be formed in a cover type of a form capable of filling a shielding groove formed on the window.

According to an embodiment of the present disclosure, the light blocking part 5326 can be formed to segregate from the window 530. For example, the light blocking part 5326 can be located in a groove provided in the window 530.

Furthermore, referring to FIG. 7A and according to an embodiment of the present disclosure, a flash wave guide part 5325 of a protrusion part corresponding to the flash 520 and a light-emitting wave guide part 5323 and a light-receiving wave guide part 5322 corresponding to the HRM sensor 510 can be exposed from an outer surface of an exterior housing of the electronic device.

Figure 7B:
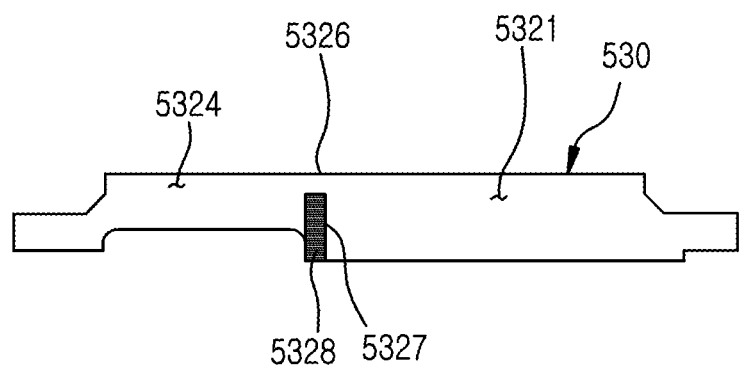
FIG. 7B is a principal part cross-section illustrating a state of applying a filler to a shielding groove of a window according to an embodiment of the present disclosure.

FIG. 7B is a principal part cross-section illustrating a state of applying a filler to a shielding groove of a window according to an embodiment of the present disclosure.

Referring to FIG. 7B, according to an embodiment of the present disclosure, a light blocking part 5326 can include a shielding groove 5327 provided to optically segregate a first region 5324 and a second region 5321 of a window 530, and a filler 5328 of an opaque material (e.g., substance of rubber, urethane, silicon or polycarbonate material) can be located within the shielding groove 5327.

Figure 7C:
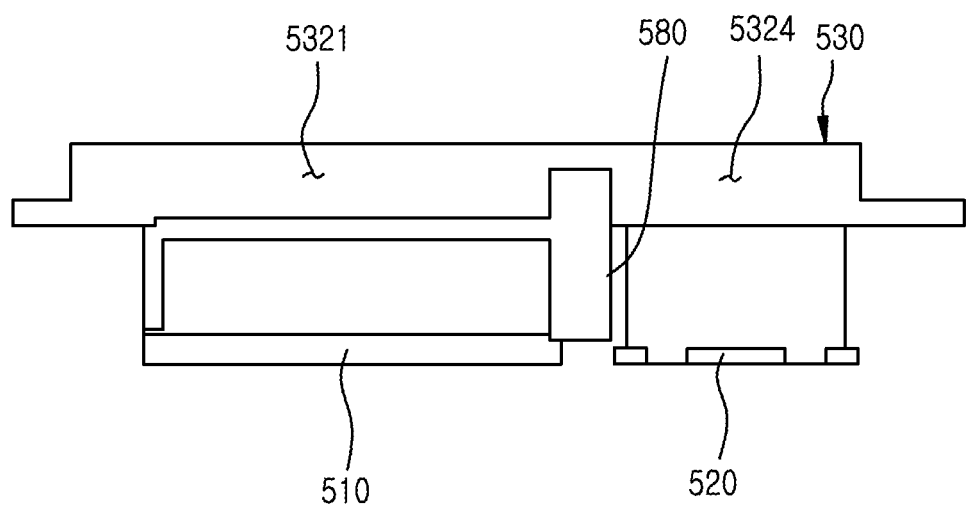
FIG. 7C is a principal part cross-section illustrating an optical sensor module applying a light blocking part according to an embodiment of the present disclosure.

FIG. 7C is a principal part cross-section illustrating an optical sensor module applying a light blocking part according to an embodiment of the present disclosure.

Referring to FIG. 7C, according to an embodiment of the present disclosure, a light blocking part 580 can be formed to extend from the exterior of a window 530 and to cover at least a part of an optical sensor 510 so as to optically segregate a first region 5324, covering a flash 520, and a second region 5321 of the window 530.

According to an embodiment of the present disclosure, the light blocking part 580 can be extended from the exterior of the window 530 and be located in a partial region between the optical sensor 510 and an electronic component.

Figure 7D:
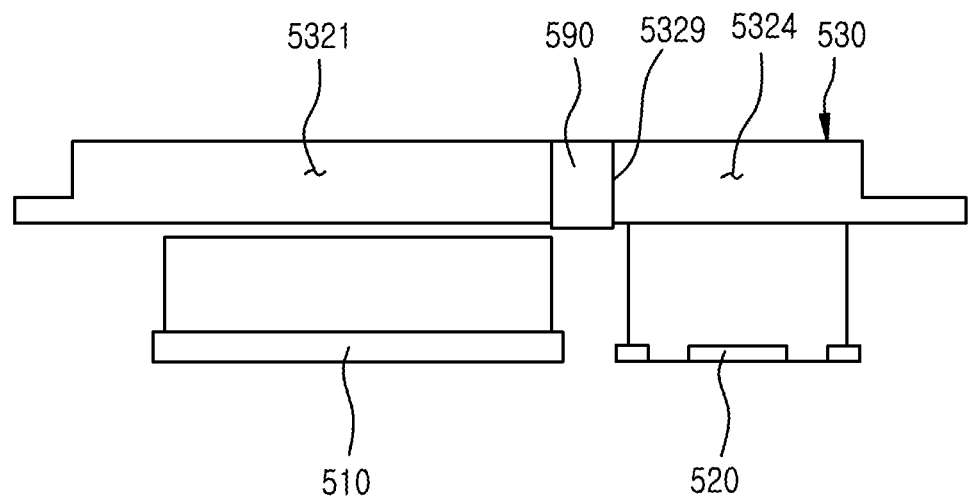
FIG. 7D is a principal part cross-section illustrating an optical sensor module applying a light blocking part according to an embodiment of the present disclosure.

FIG. 7D is a principal part cross-section illustrating an optical sensor module applying a light blocking part according to an embodiment of the present disclosure.

Referring to FIG. 7D, according to an embodiment of the present disclosure, a light blocking part 590 can be an opaque material (e.g., at least one of rubber, silicon and urethane) inserted into a groove 5329 provided in a window 530 so as to optically segregate a first region 5324, covering a flash 520, and a second region 5321, covering an optical sensor 510, of the window 530.

According to various embodiments of the present disclosure, a device (e.g., an electronic device 101) including an optical sensor can include a window (e.g., a window 530) including a first region (e.g., a first region 5324) and a second region (e.g., a second region 5321), an optical sensor (e.g., an optical sensor 510) located inside the one region among the first region and the second region, and a light blocking part (e.g., a light blocking part 5327, 5328, 580 or 590) formed in at least a partial region of the window, the partial region being located between the first region and the second region.

According to various embodiments of the present disclosure, the optical sensor can include at least one of a PhotoPlethysmoGraphy (PPG) module, a proximity sensor, and an illumination sensor.

According to various embodiments of the present disclosure, at least the partial region of the window can include a groove (e.g., a shielding groove 5327).

According to various embodiments of the present disclosure, the light blocking part can be located in an internal part of the groove. For example, the light blocking part can include a light blocking part 560 located in an internal part of the groove.

According to various embodiments of the present disclosure, at least a portion of an internal part of the groove can include a substance for blocking out light. For example, at least a part of an internal wall of the groove can be, for example, color painted or light reflection painted in order to block out light.

According to various embodiments of the present disclosure, the light blocking part can include at least a substance for blocking out light entering from the outside of an electronic device.

According to various embodiments of the present disclosure, the light blocking part can include at least one of rubber, urethane, silicon and polycarbonate materials.

According to various embodiments of the present disclosure, the light blocking part can be formed integrally with the window.

According to various embodiments of the present disclosure, the light blocking part can be formed by etching at least the partial region of the window.

According to various embodiments of the present disclosure, the light blocking part can be formed by coloring one surface of at least the partial region of the window.

According to various embodiments of the present disclosure, the light blocking part can be formed to extend from the outside of the window and cover at least a part of the optical sensor.

According to various embodiments of the present disclosure, the light blocking part can be partially located between the window and the optical sensor.

According to various embodiments of the present disclosure, the electronic device including the optical sensor can further include a housing connected with at least a part of the window.

According to various embodiments of the present disclosure, the light blocking part can be formed to be at least partially connected with the housing.

According to various embodiments of the present disclosure, the device can further include another light blocking part located inside the window.

According to various embodiments of the present disclosure, the device can further include an electronic component located inside a remaining other region from among the first region and the second region.

According to various embodiments of the present disclosure, a device including an optical sensor can include a window including a first region and a second region, an optical sensor located inside the one region among the first region and the second region, and a light blocking part located in a groove provided in a partial region of the window, the partial region being located between the first region and the second region.

According to various embodiments of the present disclosure, the light blocking part can include at least one of rubber, urethane, silicon and polycarbonate materials.

According to various embodiments of the present disclosure, a device including an optical sensor can include a window including a first region and a second region, an optical sensor located inside the one region among the first region and the second region, and a light blocking part located in a groove provided by penetrating at least a partial region of the window, the partial region being located between the first region and the second region.

According to various embodiments of the present disclosure, the light blocking part can be formed such that at least one surface of the light blocking part forms a plane with at least one surface of the window.

Figure 8:
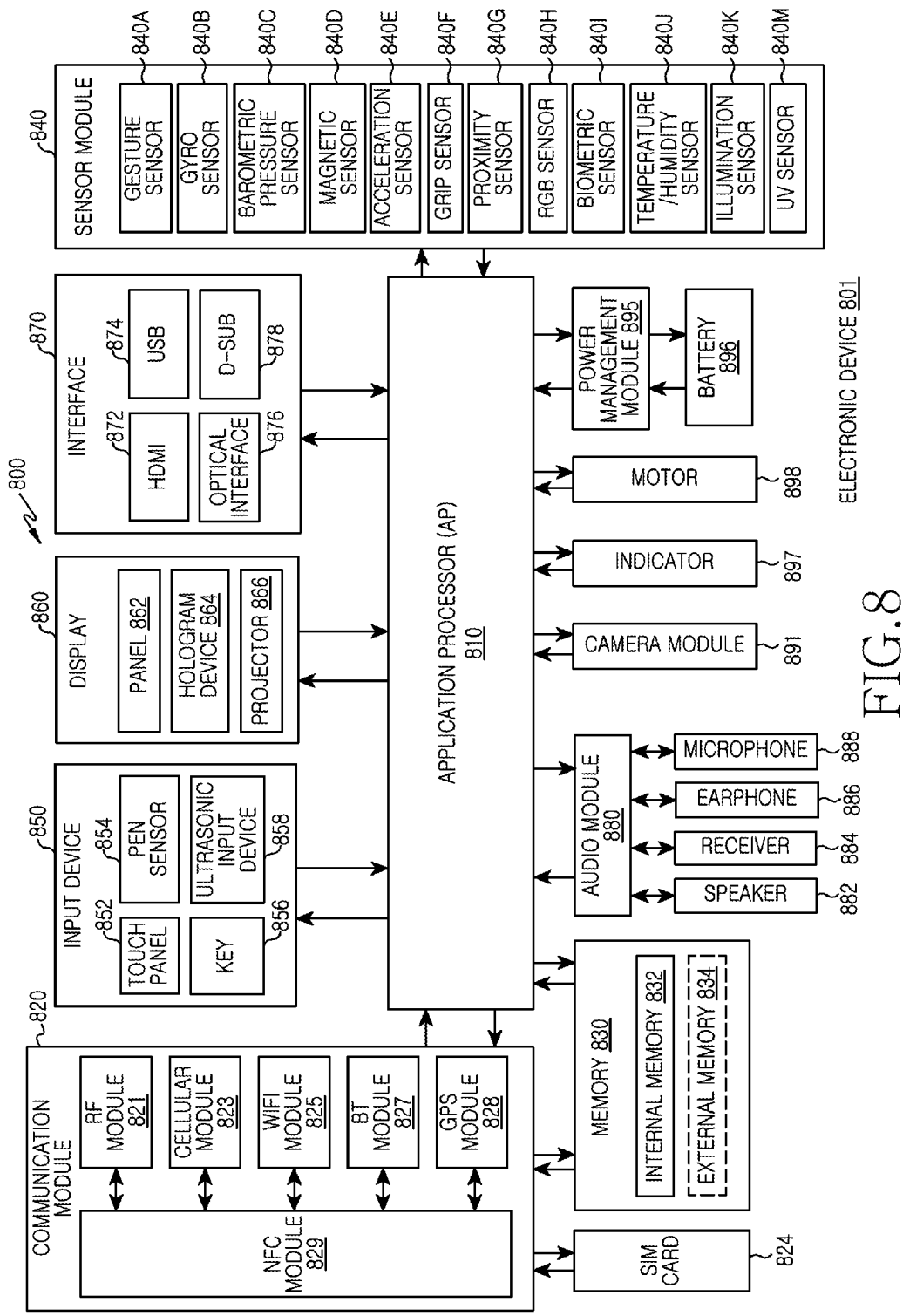
FIG. 8 is a block diagram illustrating a construction of an electronic device according to an embodiment of the present disclosure.

FIG. 8 is a block diagram illustrating a construction of an electronic device according to an embodiment of the present disclosure.

Referring to FIG. 8, a block diagram 800 including an electronic device 801 is illustrated, where the electronic device 801 can, for example, construct the whole or part of the electronic device 101 illustrated in FIG. 1. As illustrated in FIG. 8, the electronic device 801 can include one or more Application Processors (APs) 810, a communication module 820, a Subscriber Identification Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 can drive an operating system or application program and control a plurality of hardware or software constituent elements connected to the AP 810. The AP 810 can perform processing and operation of various data including multimedia data. The AP 810 can be, for example, implemented as a System on Chip (SoC). According to an embodiment of the present disclosure, the AP 810 can further include a Graphic Processing Unit (GPU) (not shown).

The communication module 820 (e.g., a communication interface 160 of FIG. 1) can perform data transmission/reception in communication between other electronic devices (e.g., an electronic device 104 or a server 106 of FIG. 1) connected with the electronic device 801 (e.g., the electronic device 101) through a network. According to an embodiment of the present disclosure, the communication module 820 can include a cellular module 823, a WiFi module 825, a BT module 827, a GPS module 828, an NFC module 829, and a Radio Frequency (RF) module 821.

The cellular module 823 can provide voice telephony, video telephony, a text service, an Internet service and the like through a communication network (e.g., LTE, LTE-A, CDMA, WCDMA, UMTS, WiBro, GSM or the like). Also, the cellular module 823 can, for example, perform electronic device distinction and authorization within a communication network using a subscriber identification module (e.g., the SIM card 824). According to an embodiment of the present disclosure, the cellular module 823 can perform at least some functions among functions that the AP 810 can provide. For example, the cellular module 823 can perform at least a part of a multimedia control function.

According to an embodiment of the present disclosure, the cellular module 823 can include a Communication Processor (CP). Also, the cellular module 823 can be, for example, implemented as an SoC. Referring to FIG. 8, the constituent elements such as the cellular module 823 (e.g., the communication processor), the memory 830, the power management module 895 and the like are illustrated as constituent elements separate from the AP 810. However, according to an embodiment of the present disclosure, the AP 810 can be implemented to include at least some (e.g., the cellular module 823) of the aforementioned constituent elements.

According to an embodiment of the present disclosure, the AP 810 or the cellular module 823 (e.g., the communication processor) can load to a volatile memory an instruction or data received from a nonvolatile memory connected to each of the AP 810 and the cellular module 823 or at least one of other constituent elements, and process the loaded instruction or data. Also, the AP 810 or the cellular module 823 can store data received from at least one of other constituent elements or generated in at least one of the other constituent elements, in the nonvolatile memory.

The WiFi module 825, the BT module 827, the GPS module 828, and the NFC module 829 can each include a processor for processing data transmitted/received through the corresponding module, for example. Referring to FIG. 8, each of the cellular module 823, the WiFi module 825, the BT module 827, the GPS module 828 and the NFC module 829 is illustrated as a separate block. But, according to an embodiment of the present disclosure, at least some (e.g., two) of the cellular module 823, the WiFi module 825, the BT module 827, the GPS module 828 and the NFC module 829 can be included within one Integrated Circuit (IC) or IC package. For example, at least some processors corresponding to the cellular module 823, the WiFi module 825, the BT module 827, the GPS module 828 and the NFC module 829, for example, a communication processor corresponding to the cellular module 823 and a WiFi processor corresponding to the WiFi module 825 can be implemented as one SoC.

The RF module 821 can perform data transmission/reception, for example, RF signal transmission/reception. The RF module 821 can include, though not illustrated, a transceiver, a Power Amp Module (PAM), a frequency filter, a Low Noise Amplifier (LNA) or the like, for example. Also, the RF module 821 can further include components, for example, a conductor, a conductive line and the like for transmitting/receiving an electromagnetic wave on a free space in wireless communication. Referring to FIG. 8, it is illustrated that the cellular module 823, the WiFi module 825, the BT module 827, the GPS module 828, and the NFC module 829 share one RF module 821 with each other. But, according to an embodiment of the present disclosure, at least one of the cellular module 823, the WiFi module 825, the BT module 827, the GPS module 828, and the NFC module 829 can perform RF signal transmission/reception through a separate RF module.

The SIM card 824 can be a card including a subscriber identification module, and can be inserted into a slot provided in a specific location of the electronic device 801. The SIM card 824 can include unique identification information (e.g., an Integrated Circuit Card ID (ICCID)) or subscriber information (e.g., an International Mobile Subscriber Identity (IMSI)).

The memory 830 (e.g., a memory 130 of FIG. 1) can include an internal memory 832 or an external memory 834. The internal memory 832 can, for example, include at least one of a volatile memory (e.g., a Dynamic Random Access Memory (DRAM), a Static RAM (SRAM), a Synchronous Dynamic RAM (SDRAM) and the like) and a nonvolatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory and the like).

According to an embodiment of the present disclosure, the internal memory 832 can be a Solid State Drive (SSD). The external memory 834 can further include a flash drive, for example, Compact Flash (CF), Secure Digital (SD), micro-SD, Mini-SD, extreme Digital (xD), a memory stick or the like. The external memory 834 can be functionally connected with the electronic device 801 through various interfaces. According to an embodiment of the present disclosure, the electronic device 801 can further include a storage device (or storage media) such as a hard drive.

The sensor module 840 can measure a physical quantity or sense an activation state of the electronic device 801, and convert measured or sensed information into an electrical signal. The sensor module 840 can, for example, include at least one of a gesture sensor 840A, a gyro sensor 840B, an air (e.g., barometric) pressure sensor 840C, a magnetic sensor 840D, an acceleration sensor 840E, a grip sensor 840F, a proximity sensor 840G, a color sensor 840H (e.g., a Red, Green, Blue (RGB) sensor), a bio-physical (e.g., biometric) sensor 840I, a temperature/humidity sensor 840J, an illumination sensor 840K, and a Ultraviolet (UV) sensor 840M. Additionally or alternatively, the sensor module 840 can, for example, include an E-nose sensor (not shown), an Electromyography (EMG) sensor (not shown), an Electroencephalogram (EEG) sensor (not shown), an Electrocardiogram (ECG) sensor (not shown), an IR sensor (not shown), an iris sensor (not shown), a fingerprint sensor (not shown) and the like. The sensor module 840 can further include a control circuit for controlling at least one or more sensors belonging therein.

The input device 850 can include a touch panel 852, a (digital) pen sensor 854, a key 856, and an ultrasonic input device 858. The touch panel 852 can, for example, recognize a touch input in at least one method among a capacitive overlay method, a pressure sensitive method, an infrared beam method, and an acoustic wave method. Also, the touch panel 852 can also further include a control circuit. In the capacitive overlay method, physical contact or proximity recognition is possible. The touch panel 852 can also further include a tactile layer. In this case, the touch panel 852 can provide a tactile response to a user.

The (digital) pen sensor 854 can be, for example, implemented using the same or similar method to that of receiving a user's touch input or a separate sheet for recognition. The key 856 can, for example, include a physical button, an optical key, a keypad, or a touch key. The ultrasonic input device 858 is a device capable of confirming data by sensing a sound wave with a microphone 888 of the electronic device 801 through an input tool generating an ultrasonic signal. With the ultrasonic input device 858 it is possible to perform wireless recognition. According to an embodiment of the present disclosure, by using the communication module 820, the electronic device 801 can also receive a user input from an exterior device (e.g., a computer or a server) connected to the communication module 820.

The display 860 (e.g., a display 150 of FIG. 1) can include a panel 862, a hologram device 864, and a projector 866. The panel 862 can be, for example, a Liquid Crystal Display (LCD), an Active-Matrix Organic LED (AMOLED) or the like. The panel 862 can be, for example, implemented to be flexible, transparent, or wearable. The panel 862 can be also constructed together with the touch panel 852 as one module. The hologram device 864 can show a three-dimensional image in the air using interference of light. The projector 866 can display a video by projecting light to a screen. The screen can be, for example, located inside or outside the electronic device 801. According to an embodiment of the present disclosure, the display 860 can further include a control circuit for controlling the panel 862, the hologram device 864, and the projector 866.

The interface 870 can, for example, include a High-Definition Multimedia Interface (HDMI) 872, a USB 874, an optical interface 876, or a D-subminiature (D-sub) 878. The interface 870 can be, for example, included in a communication interface 160 illustrated in FIG. 1. Additionally or alternatively, the interface 870 can, for example, include a Mobile High-definition Link (MHL) interface, a Secure Digital/Multi Media Card (SD/MMC) interface, or an Infrared Data Association (IrDA) standard interface.

The audio module 880 can convert sound and an electric signal interactively. At least some constituent elements of the audio module 880 can be, for example, included in an input/output interface 140 illustrated in FIG. 1. The audio module 880 can process sound information inputted or outputted through a speaker 882, a receiver 884, an earphone 886, the microphone 888, or the like, for example.

The camera module 891 is a device capable of taking a still picture and a moving picture. According to an embodiment of the present disclosure, the camera module 891 can include one or more image sensors (e.g., a front sensor or rear sensor), a lens (not shown), an Image Signal Processor (ISP) (not shown), or a flash (not shown) (e.g., an LED or a xenon lamp).

The power management module 895 can manage power of the electronic device 801. Though not illustrated, the power management module 895 can include, for example, a Power Management Integrated Circuit (PMIC), a charger IC, and a battery or fuel gauge.

The PMIC can be, for example, mounted within an integrated circuit or a SoC semiconductor. A charging method can be divided into wired and wireless charging methods. The charger IC can charge a battery, and can prevent the introduction of overvoltage or overcurrent from an electric charger. According to an embodiment of the present disclosure, the charger IC can include a charger IC of at least one of the wired charging method and the wireless charging method. As the wireless charging method, there are, for example, a magnetic resonance method, a magnetic induction method, an electromagnetic wave method and the like. Supplementary circuits for wireless charging, for example, circuits such as a coil loop, a resonance circuit, a rectifier and the like can be added.

The battery gauge can, for example, measure a level of the battery 896 and a voltage in charging, an electric current, and a temperature. The battery 896 can store and generate electricity, and can supply a power source to the electronic device 801 using the stored or generated electricity. The battery 896 can, for example, include a rechargeable battery or a solar battery.

The indicator 897 can display a specific state of the electronic device 801 or part (e.g., the AP 810) thereof, for example, a booting state, a message state, a charging state or the like. The motor 898 can convert an electrical signal into a mechanical vibration. Though not illustrated, the electronic device 801 can include a processing device (e.g., a GPU) for mobile TV support. The processing device for mobile TV support can process media data according to the standards of Digital Multimedia Broadcasting (DMB), Digital Video Broadcasting (DVB), a media flow or the like, for example.

The aforementioned constituent elements of an electronic device according to various embodiments of the present disclosure can be each comprised of one or more components, and a name of the corresponding constituent element can be different according to the kind of the electronic device. The electronic device according to the various embodiments of the present disclosure can include at least one of the aforementioned constituent elements, and can omit some constituent elements or further include additional other constituent elements. Also, some of the constituent elements of the electronic device according to various embodiments of the present disclosure are combined and constructed as one entity, thereby being able to identically perform the functions of the corresponding constituent elements before combination.

The term "module" used in various embodiments of the present disclosure can, for example, represent units including one or a combination of two or more of hardware, software, and firmware. The "module" can be used interchangeably with the terms "unit", "logic", "logical block", "component", "circuit" and the like, for example. The "module" can be the minimum unit of an integrally constructed component or part thereof. The "module" can be also the minimum unit performing one or more functions or part thereof. The "module" can be implemented mechanically or electronically. For example, the "module" according to various embodiments of the present disclosure can include at least one of an Application-Specific Integrated Circuit (ASIC) chip, Field-Programmable Gate Arrays (FPGAs) and a programmable logic device performing some operations known to the art or to be developed in the future.

According to various embodiments of the present disclosure, at least a part of an apparatus (e.g., modules or functions thereof) or method (e.g., operations) according to various embodiments of the present disclosure can be, for example, implemented by instructions stored in a non-transitory computer-readable storage media in a form of a programming module. When the instruction is executed by one or more processors, the one or more processors can perform functions corresponding to the instructions. The non-transitory computer-readable storage media can be the memory 830, for instance. At least a part of the programming module can be, for example, implemented (e.g., executed) by the processor 810. At least a part of the programming module can, for example, include a module, a program, a routine, a set of instructions, a process or the like for performing one or more functions.

The non-transitory computer-readable recording media can include magnetic media such as a hard disk, a floppy disk, and a magnetic tape, optical media such as a Compact Disc-Read Only Memory (CD-ROM) and a DVD, a Magneto-Optical Media such as a floptical disk, and a hardware device specially configured to store and perform a program instruction (e.g., the programming module) such as a ROM, a RAM, a flash memory and the like. Also, the program instruction can include not only a mechanical code such as a code made by a compiler but also a high-level language code executable by a computer using an interpreter and the like. The aforementioned hardware device can be constructed to operate as one or more software modules so as to perform operations of various embodiments of the present disclosure, and vice versa.

A module or a programming module according to various embodiments of the present disclosure can include at least one or more of the aforementioned constituent elements, or omit some of the aforementioned constituent elements, or include additional other constituent elements. Operations carried out by the module, the programming module or the other constituent elements according to the various embodiments of the present disclosure can be executed in a sequential, parallel, repeated or heuristic method. Also, some operations can be executed in different order or can be omitted, or other operations can be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device comprising:
    a window comprising a first region, a second region and a partial region located between the first region and the second region;
    an optical sensor disposed inside one region among the first region and the second region;
    an electronic component located inside another region among the first region and the second region; and
    a light blocking part included in the partial region of the window,
    wherein the region of the window corresponding to the optical sensor includes a light-emitting wave guide part and a light-receiving wave guide part exposed from an outer surface of the device.

2. The device of claim 1, wherein the optical sensor comprises at least one of a PhotoPlethysmoGraphy (PPG) module, a proximity sensor, and an illumination sensor.

3. The device of claim 1, wherein the partial region of the window comprises at least one groove.

4. The device of claim 3, wherein the light blocking part is located in an internal part of the groove.

5. The device of claim 3, wherein at least a portion of an internal part of the groove comprises a substance for blocking out light.

6. The device of claim 1, wherein the light blocking part comprises at least a substance for blocking out light entering from outside of an electronic device.

7. The device of claim 1, wherein the light blocking part comprises at least one of rubber, urethane, silicon and polycarbonate materials.

8. The device of claim 1, wherein the light blocking part is formed integrally with the window.

9. The device of claim 7, wherein the light blocking part is formed by etching at least the partial region of the window.

10. The device of claim 7, wherein the light blocking part is formed by coloring one surface of at least the partial region of the window.

11. The device of claim 1, wherein the light blocking part is formed to extend from outside of the window and to cover at least a part of the optical sensor.

12. The device of claim 11, wherein the light blocking part is partially located between the window and the optical sensor.

13. The device of claim 1, further comprising a housing connected with at least a part of the window.

14. The device of claim 13, wherein the light blocking part is formed to be at least partially connected with the housing.

15. The device of claim 1, further comprising another light blocking part located inside the window.

16. The device of claim 1,
    wherein the electronic component includes a flash disposed inside another region among the first region and the second region, and
    wherein the region of the window corresponding to the flash includes a flash wave guide part exposed from the outer surface of the device.

17. An electronic device comprising:
    a window comprising a first region, a second region and a partial region located between the first region and the second region;
    an optical sensor disposed inside one region among the first region and the second region;
    an electronic component located inside another region among the first region and the second region; and
    a light blocking part disposed in a groove provided in the partial region of the window,
    wherein the region of the window corresponding to the optical sensor includes a light-emitting wave guide part and a light-receiving wave guide part exposed from an outer surface of the electronic device.

18. The electronic device of claim 17, wherein the light blocking part comprises at least one of rubber, urethane, silicon and polycarbonate materials.

19. An electronic device comprising:
    a window comprising a first region, a second region and a partial region disposed between the first region and the second region;
    an optical sensor located inside one region among the first region and the second region;
    an electronic component located inside another region among the first region and the second region; and
    a light blocking part disposed in a groove provided by penetrating the partial region of the window,
    wherein the region of the window corresponding to the optical sensor includes a light-emitting wave guide part and a light-receiving wave guide part exposed from an outer surface of the electronic device.

20. The electronic device of claim 19,
    wherein the electronic component further includes a flash disposed inside another region among the first region and the second region, and
    wherein the region of the window corresponding to the flash includes a flash wave guide part exposed from the outer surface of an exterior housing of the electronic device.

* * * * *